Oct. 23, 1951   L. R. SHADDUCK   2,572,770
VEGETABLE SPLITTER
Filed July 16, 1949   2 SHEETS—SHEET 2
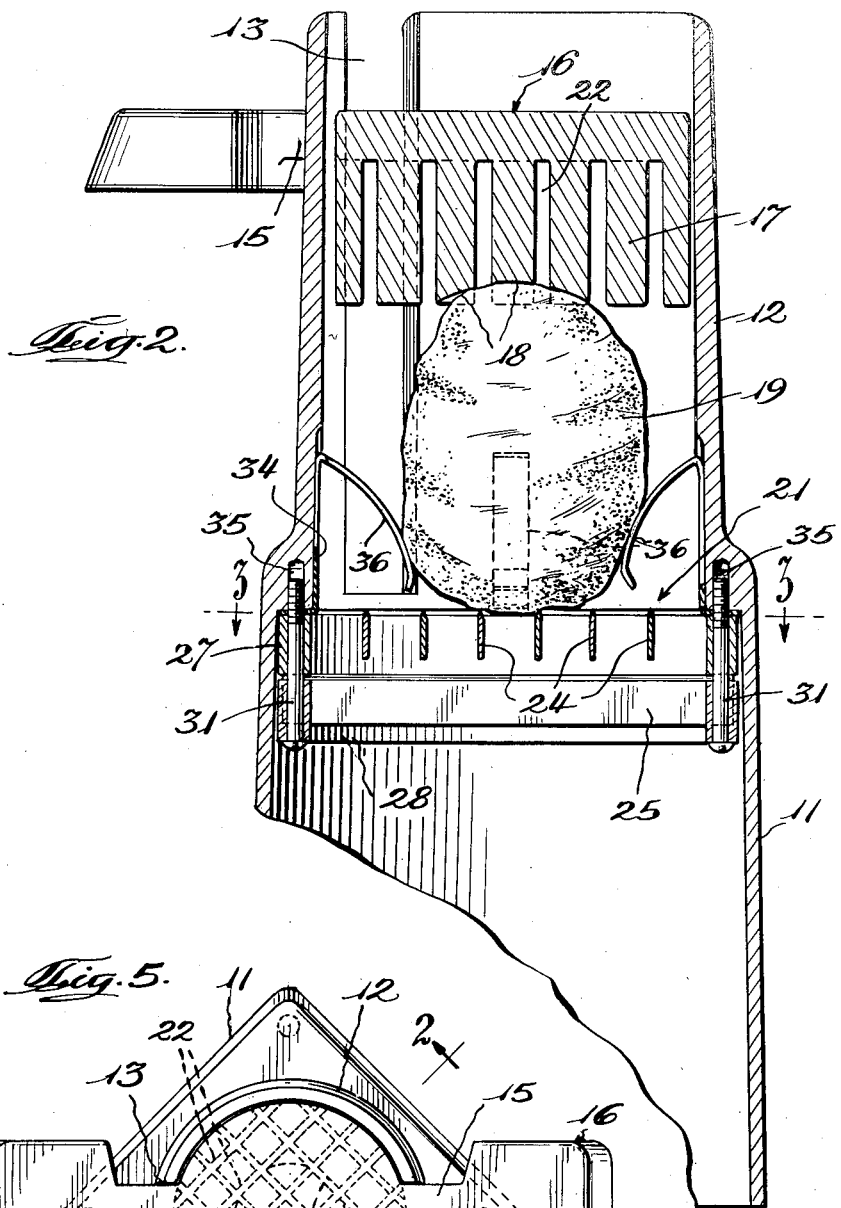
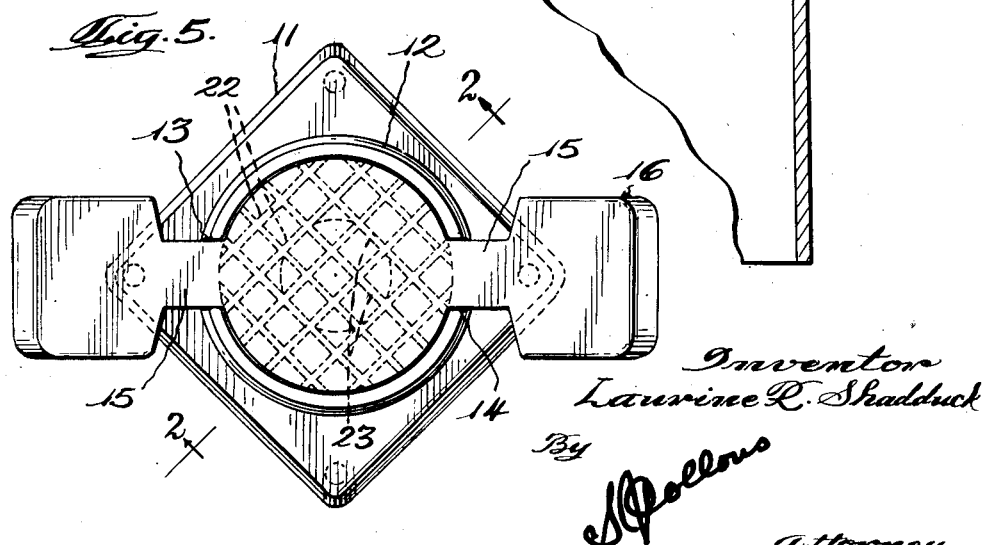
Inventor
Laurine R. Shadduck
By
Attorney Patented Oct. 23, 1951

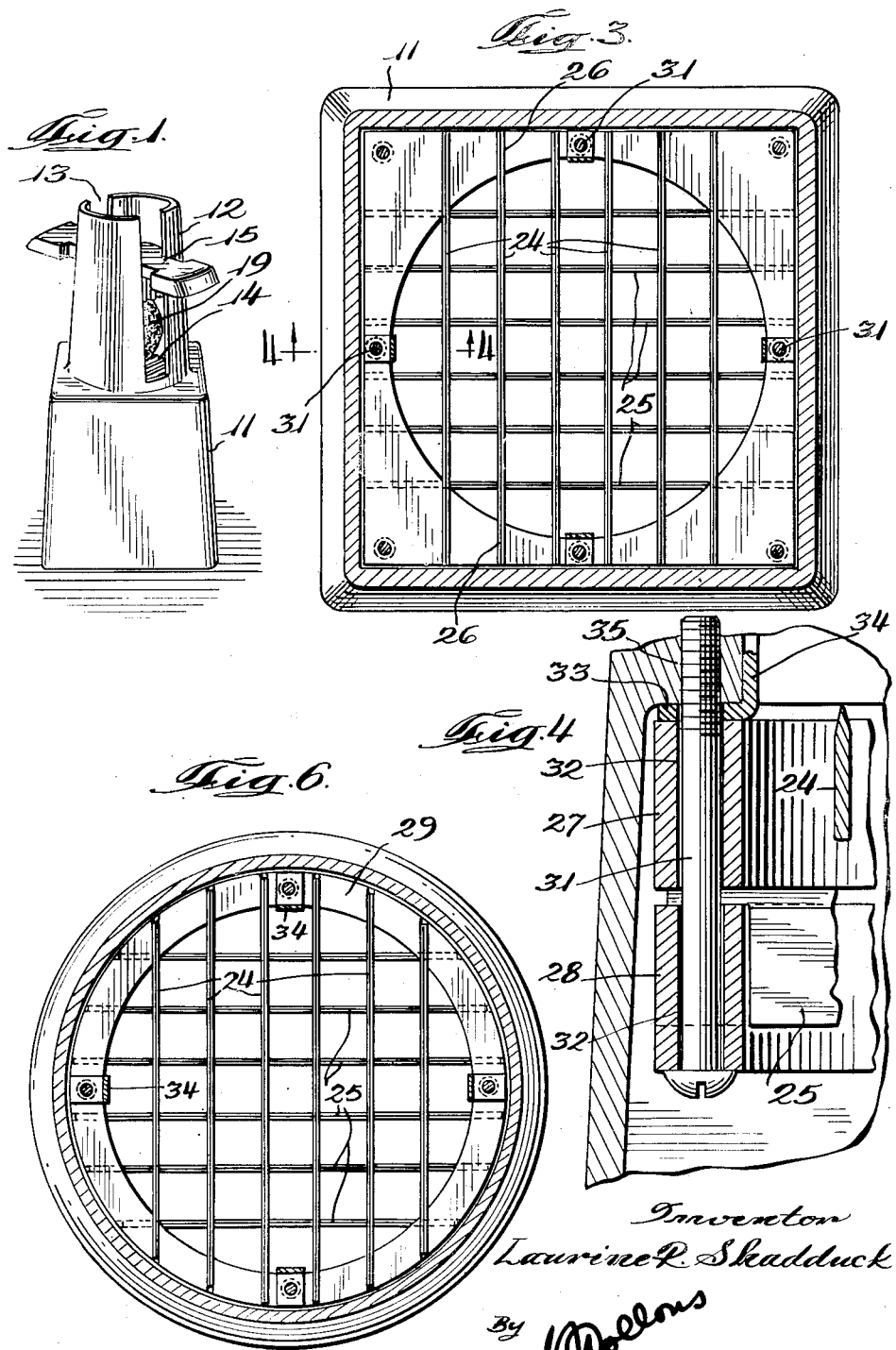

2,572,770

UNITED STATES PATENT OFFICE 2,572,770

VEGETABLE SPLITTER

Laurine R. Shadduck, Chicago, Ill.

Application July 16, 1949, Serial No. 105,140

3 Claims. (Cl. 146—169)

The present invention relates to food processing apparatus that is especially adapted to domestic use and is concerned more particularly with a safety and utility device that may be employed in the preparation of potatoes for frying or roasting.

One method of preparing potatoes which is very popular on the American table is the so-called "French frying" practice. For this purpose, raw potatoes are peeled and split lengthwise into regularly cross-sectioned strips. These strips are then submerged in hot grease after which they acquire simultaneously a depth cooking and frying incrustation which makes them palatable and digestible. For the purpose of table consumption, potatoes may not be practically or economically split into these strips under the same methods as are available in restaurants and other places of commercial or industrial establishment. Consequently, householders have been following the practice of cutting a raw potato into sections and thereafter slicing the sections, using for both of these operations an ordinary table knife.

Since potatoes vary in size as well as in shape and density, cutting them with an ordinary knife results in the production of different sized splittings and incurs a considerable hazard in handling of a knife under conditions of repeated or numerous cuttings. Further, where several persons are engaged in the preparing of potatoes for a single batch, the proportioning of the splittings may vary considerably with the result that subsequently on deep frying these splittings certain ones of them will acquire a deeper incrustation or crispness, while others of them that are correspondingly thicker may fail to be cooked through sufficiently to be properly digestible and/or palatable.

Accordingly, it is a principal object of the present invention to provide a special purpose device that is particularly suitable for domestic kitchen use which will quickly and safely split potatoes or other pulpy vegetables into longitudinal chips or sections of uniform thickness without special skill or aptitude, and, at the same time, to afford an apparatus which may be quickly and conveniently cleansed after use, so as to remove residual deposits and inhibit tarnish.

Other objects of this invention are such that will appear during the course of the following detailed description, and such as are brought out by the hereinafter appended claims.

For a more comprehensive understanding of the present invention, reference will now be had to the accompanying drawings and to the detailed specification hereinafter in which like reference numerals designate corresponding parts throughout; and in which, Fig. 1 is a diminutive perspective view of a preferred form of vegetable splitter constructed in accordance with the principles of the present invention;

Fig. 2 is a vertical sectional view taken approximately on line 2—2 of Fig. 5 featuring the apparatus illustrated in Fig. 1 and showing the internal structure with a potato in position for treatment;

Fig. 3 is a plan sectional view taken approximately on line 3—3 of Fig. 2;

Fig. 4 is an enlarged detail sectional view taken approximately on line 4—4 of Fig. 3;

Fig. 5 is a plan view of the apparatus illustrated in Figs. 1 through 4, inclusive; and Fig. 6 is a plan sectional view in correspondence with the view designated Fig. 3 of a modified form of apparatus differing basically in cross-sectional design.

Attention is directed now more particularly to the structural details of the accompanying drawings in which the reference numeral 11 illustrates a truncated pyramidal base structure that may be integrally associated with a truncated conical superstructure 12 so as to produce a graceful well balanced and operatively stable unit to withstand the manipulation technique for which, as will now be explained, its services have been designed.

The superstructure 12 is provided with a pair of opposite vertical slots 13 and 14 that serve as guideways to the necked-down portions 15 of a pusher type of ram generally designated 16.

The superstructure 12 is preferably of circular cross-section affording a cylindrical inner wall surface that may be generously spaced from the cylindrical periphery of a plunger portion 17 of the ram 16.

The nethermost surface of the plunger portion 17 may be provided with an arcuate concavity 18 or, if preferred, this apparatus can be sloped with geometrically simple straight sides, an arrangement which will also assist in centering and locating a potato or other vegetable 19 as it is projected through the knife assembly 21. The cylindrical plunger portion 17 of the ram 16 is additionally provided with intersecting notches 22 and 23, Fig. 5, which register with the two sets of splitting knives 24 and 25, Fig. 6, indicated as being in different horizontal levels, see also Fig. 4.

In the preferred embodiment of construction, as exemplified in Figs. 1 through 5, the coordinate arrangement of knife blades 24 and 25 contemplates blade elements of equal length that may be fitted into end notches 26 of square perimetric holders 27 and 28. The holders in the modified form of Fig. 6 are circular elements 29, and as a result the coordinate blades 24 and 25 vary in length in order to be fitted endwise into a circular placement. Either types of holders 27 or 29 are provided with end notches 26 into which the blades 24 and 25 are seated. By stacking the two holders, as best indicated in Fig. 4, a single set of assembly screws 31, which enter through holes 32 in the holder rings or frames and which pass also through the bent over portions 33 of the aligning spring elements 34, have screw threaded engagement as at 35 with the wall of the base structure.

The centering springs 34 which are shown to be four in number in both embodiments and are made of strip spring material shaped after the manner best indicated in Fig. 2 so as to provide downwardly and inwardly sloping tongues 36 that serve to center the potato 19 as it is dropped into position and before the plunger 17 has had an opportunity to apply its arcuate or hollow curvature 18 towards this purpose.

It will thus be seen that between the centering springs 36 and the concavity 18 the vegetable is securely maintained in centering alignment assuring that the depression of the ram 16 will produce straight parallel cuttings as the potato 19 is forced through the knife blade assemblies of holders 27 and 28.

It is to be observed that the few screws 31, which are employed in retaining the knife holders 27 and 28 as well as the centering springs 33, are the sole removable constituents of the base structure of the device, and these may be easily withdrawn in those cases when it may be desired to replace any of the parts or to sharpen the knives. Also, this construction permits of the initial manufacturing costs to be maintained at relatively low level requiring as it does small assembly operator's time.

It is noteworthy that through the practice of the foregoing disclosed principal body construction there is evolved a mono-block arrangement that may be expeditiously moulded in aluminum, white metal, etc., and also one which may be just as practically produced under methods of plastic moulding. Making the principal body in one piece with a single set of moulding dies has been the principal factor in producing this product at low cost and well within a popular appeal price scale.

In order to cleanse the unit after each use, it is but necessary to permit running water to pass over the cutting knives and the internal surfaces of the main structure to achieve total removal of residual juices and acid traces. In this way, the unit lends itself attractively to be used on informal occasions and under short notice without troubling the householder with any onerous tasks of disassembly for cleaning. All parts are exposed to a principal stream of running water which is permitted to pass end for end through the unit and carry away residual deposits therefrom.

The ram 16 has been illustrated as a manually depressible apparatus adapted to be actuated by a pair of opposite pressure paddles or handles. It is contemplated also that this ram may be depressed by a mechanical advantage lever pivotally supported on the principal frame and having a work projection directed at the midpoint of the back of the plunger 17.

While the present invention has been explained and described with reference to specifically illustrated embodiments, it is to be understood, nevertheless, that numerous modifications and variations may be invoked without departing from the essential spirit or scope thereof. Accordingly, it is not intended to be limited by the particulars of the foregoing description nor by the examples illustrated in the accompanying drawings, except as indicated in the hereunto appended claims.

The invention claimed is:

1. In apparatus suitable for domestic utility adapted to be constructed as a mono-block moulding tapering downwardly and outwardly at a shallow angle and which comprises an upstanding shell-like housing having a continuous vertical passageway of cylindrical cross section interiorly thereof forming a vegetable receiving chamber and having diametrically aligned vertically positioned slots therein, and which merges at an intermediate level through a downwardly facing shoulder into a discharge chamber portion of substantially square cross-section, whereby chamber capacity is achieved in said discharge chamber portion for accommodating the vegetable splittings to an extent commensurate with the quadrangular periphery, a system of coordinately arranged splitting knives consisting of two parallel groups of knife blades, one group being positioned at substantially right angles to the other, with the blades of each group spaced according to predetermined dimensions, said system of knives being embedded in a perimetric defining frame which is removably anchored upon said downwardly facing shoulder, a plunger member for pushing whole vegetables from said vegetable-receiving chamber through said system of knives into the discharge chamber portion comprising a ram portion consisting of a body slidably received for vertical reciprocation in said vegetable-receiving chamber and divided by intersecting slots therethrough which register with the knife blades of both parallel groups of the system into protuberant subdivisions of length sufficient to penetrate the combined depth of said coordinate system of splitting knives, and a pusher yoke integral with said ram portion consisting of oppositely extending portions of reduced width constrained for guidance in the vertically positioned slots in the shell-like housing, and pressure handles on the outer ends of said oppositely extending portions for exerting operating force on said ram.

2. In an apparatus suitable for domestic utility adapted to be constructed as a mono-block moulding tapering downwardly and outwardly at a shallow angle and which comprises an upstanding shell-like housing having a continuous vertical passageway of cylindrical cross section interiorly thereof forming a vegetable-receiving chamber and having diametrically aligned vertically positioned slots therein, and which merges at an intermediate level through a downwardly facing shoulder into a discharge chamber portion of substantially square cross-section, whereby chamber capacity is achieved in said discharge chamber portion for accommodating the vegetable splittings to an extent commensurate with the quadrangular periphery, a system of coordinately arranged splitting knives consisting of two parallel groups of knife blades, one group being positioned at substantially right angles to the other, with the blades of each group spaced according to predetermined dimensions, a perimetric defining frame in which said system of knives is embedded, attachment means for removably securing said perimetric defining frame upon said downwardly facing shoulder, upwardly extending spring aligning elements each secured at one end between the perimetric defining frame and the shoulder by said attachment means and having downturned outer ends adapted to hold the vegetable to be sliced in substantially vertical position on the upper group of knife blades, a plunger member for pushing whole vegetables from said vegetable-receiving chamber through said system of knives into the discharge chamber portion comprising a ram portion consisting of a body slidably received for vertical reciprocation in said vegetable-receiving chamber and divided by intersecting slots therethrough which register with the knife blades of both parallel groups of the system into protuberant subdivisions of length sufficient to penetrate the combined depth of said coordinate system of splitting knives, and a pusher yoke integral with said ram portion consisting of oppositely extending portions of reduced width constrained for guidance in the vertically positioned slots in the shell-like housing, and pressure handles on the outer ends of said oppositely extending portions for exerting operating force on said ram.

3. In an apparatus suitable for domestic utility adapted to be constructed as a mono-block moulding tapering downwardly and outwardly at a shallow angle and which comprises an upstanding shell-like housing having a continuous vertical passageway of cylindrical cross section interiorly thereof forming a vegetable receiving chamber and having diametrically aligned vertically positioned slots therein, and which merges at an intermediate level through a downwardly facing shoulder into a discharge chamber portion of substantially square cross-section, whereby chamber capacity is achieved in said discharge chamber portion for accommodating the vegetable splittings to an extent commensurate with the quadrangular periphery, a first perimetric defining frame having a circular opening therethrough adapted to register with the vertical passageway through the shell-like housing, knife blades secured to the perimetric defining frame and positioned chordally of the opening therethrough, a second perimetric defining frame having a circular opening therethrough adapted to register with the circular opening through the first perimetric defining frame and the vertical passageway through the shell-like housing, knife blades secured to the second perimetric defining frame and positioned chordally of the opening therethrough, attachment means for securing the perimetric defining frames in abutting engagement to said downwardly facing shoulder with the knives on the two perimetric defining frames positioned respectively at substantially right angles to each other, a plunger member for pushing whole vegetables from said vegetable-receiving chamber through said system of knives into the discharge chamber portion comprising a ram portion consisting of a body slidably received for vertical reciprocation in said vegetable-receiving chamber and divided by intersecting slots therethrough which register with the knife bladers of both parallel groups of the system into protuberant subdivisions of length sufficient to penetrate the combined depth of said coordinate system of splitting knives, and a pusher yoke integral with said ram portion consisting of oppositely extending portions of reduced width constrained for guidance in the vertically positioned slots in the shell-like housing, and pressure handles on the outer ends of said oppositely extending portions for exerting operating force on said ram.

LAURINE R. SHADDUCK.

REFERENCES CITED

The following references are of record in the file of this patent:

UNITED STATES PATENTS

| Number | Name | Date |
| --- | --- | --- |
| 533,189 | Beuttel | Jan. 29, 1895 |
| 563,652 | Bulette | July 7, 1896 |
| 853,796 | Imes et al. | May 14, 1907 |
| 1,449,040 | Hany | Mar. 20, 1923 |
| 1,496,917 | Baerenfaenger | June 10, 1924 |
| 1,526,810 | Spartz | Feb. 17, 1925 |
| 2,479,982 | Stevens | Aug. 23, 1949 |

FOREIGN PATENTS

| Number | Country | Date |
| --- | --- | --- |
| 204,626 | Germany | Nov. 30, 1908 |
| 29,749 | Great Britain | Dec. 22, 1910 |